US012651377B2

(12) United States Patent
Terzakis et al.

(10) Patent No.: US 12,651,377 B2
(45) Date of Patent: Jun. 9, 2026

(54) DRY CALIBRATION FOR UNDERWATER SURVEY

(71) Applicant: ROSENXT HOLDING AG, Stans (CH)

(72) Inventors: George Terzakis, Bristol (GB); Lyndon Hill, Bristol (GB)

(73) Assignee: ROSENXT HOLDING AG, Stans (CH)

( * ) Notice: Subject to any disclaimer, the term of this patent is extended or adjusted under 35 U.S.C. 154(b) by 55 days.

(21) Appl. No.: 18/694,379

(22) PCT Filed: Oct. 25, 2022

(86) PCT No.: PCT/GB2022/052715
§ 371 (c)(1),
(2) Date: Mar. 21, 2024

(87) PCT Pub. No.: WO2023/073360
PCT Pub. Date: May 4, 2023

(65) Prior Publication Data
US 2024/0404111 A1 Dec. 5, 2024

(30) Foreign Application Priority Data
Oct. 27, 2021 (EP) ..................................... 21205018

(51) Int. Cl.
*G06T 7/80* (2017.01)
*G06T 15/10* (2011.01)
(Continued)

(52) U.S. Cl.
CPC ................ *G06T 7/85* (2017.01); *G06T 15/10* (2013.01); *H04N 13/239* (2018.05);
(Continued)

(58) Field of Classification Search
CPC ....... G06T 15/10; G06T 7/85; G06T 2200/04; G06T 2207/10021; G06T 7/80; H04N 13/239; H04N 13/246
See application file for complete search history.

(56) References Cited

U.S. PATENT DOCUMENTS 9,998,661 B1 * 6/2018 Banta ................... H04N 23/698
2017/0085864 A1 * 3/2017 Yang ....................... G06T 7/521
(Continued)

OTHER PUBLICATIONS

Lavest, J., Rives, G. & Lapresté, J. Dry camera calibration for underwater applications. Machine Vision and Applications 13, 245-253 (2003). https://doi.org/10.1007/s00138-002-0112-z (Year: 2003).*
(Continued)

*Primary Examiner* — Phi Hoang
(74) *Attorney, Agent, or Firm* — Knobbe Martens Olson & Bear LLP

(57) ABSTRACT
A method of calibrating a camera system comprises defining a first, a second, and a third linearly adjacent medium, wherein each medium has a different refractive index from the other mediums. A plurality of virtual planar patterns arranged in different positions or orientations relative to and in front of the virtual representation of the at least one camera lens are generated in the third medium, and a plurality of points on each of the virtual planar patterns are identified. A plurality of vector projections are generated using the refractive index of each of the first, second, and third mediums and a set of physical calibration parameters associated with the camera system-correspond to a best-fit refracted path between one of the at least one camera lens and a corresponding one of the identified plurality of points. A calibration of the camera system is executed using the generated plurality of vector projections.

11 Claims, 6 Drawing Sheets

(51) Int. Cl.
    *H04N 13/239*    (2018.01)
    *H04N 13/246*    (2018.01)

(52) U.S. Cl.
    CPC ....... *H04N 13/246* (2018.05); *G06T 2200/04* (2013.01); *G06T 2207/10021* (2013.01)

(56) References Cited

U.S. PATENT DOCUMENTS

| | | | |
|---|---|---|---|
| 2021/0289759 A1* | 9/2021 | Naval, Jr. | G06V 20/05 |
| 2021/0342988 A1* | 11/2021 | Treibitz | G06T 7/90 |
| 2023/0017422 A1* | 1/2023 | Brentano | A01K 61/90 |

OTHER PUBLICATIONS

Agrawal et al., "A theory of multi-layer flat refractive geometry", Computer Vision and Pattern Recognition (CVPR), 2012 IEEE Conference, pp. 3346-3353 (2012).

Combined Search and Examination Report issued in application No. GB2115441.4 on Jul. 6, 2022.

Dolereit et al., "Converting underwater imaging into imaging in air", International Conference on Computer Vision Theory and Applications (VISAPP) 1:96-103 (2014).

Extended European Search Report issued in application No. 21205018.1 on Apr. 8, 2022.

International Search Report issued in application No. PCT/GB2022/052715 on Jan. 13, 2023.

Luczynski et al., "Image rectification with the pinax camera model in underwater stereo systems with verged cameras", Oceans 2017—Anchorage, Marine Technology Society, pp. 1-7 (2017).

Luczynski et al., "The Pinax-model for accurate and efficient refraction correction of underwater cameras in flat-pane housings", Ocean Engineering, 133:9-22, (2017).

Sedlazeck et al., "Perspective and Non-perspective camera models in underwater imaging overview and error analysis", Outdoor and Large-scale Real-world Scene Analysis, Springer Berlin Heidelberg, Berlin Heidelberg, pp. 212-242 (2011).

* cited by examiner

DRY CALIBRATION FOR UNDERWATER SURVEY

FIELD

Embodiments described herein relate generally to a method of calibrating a camera system.

BACKGROUND

Underwater camera systems (or camera modules) allow for imaging using manned or unmanned vehicles (for instance, remote operated vehicles or ROVs). Such systems may be monocular (i.e. a single camera) or stereo (i.e. two cameras positioned adjacent to each other). It is necessary to calibrate such camera systems to compensate for distortions in the captured images. This means that conventional methods of calibrating underwater camera systems must be carried out on-site and underwater in order to accurately reflect the distortions when the camera system is in use.

However, conventional underwater camera calibration procedures are time consuming and difficult to achieve accurately, as a result of factors such as rough weather, limited space to manoeuvre the underwater vehicle, poor natural lighting, etc. As a result, it would be beneficial to be able to accurately calibrate a camera system for underwater use without the need to carry out the calibration procedure underwater.

SUMMARY OF INVENTION

In accordance with a first aspect of the invention, there is provided a method of calibrating a camera system, the method comprising:

defining a three-dimensional virtual environment comprising a plurality of linearly adjacent mediums, the linearly adjacent mediums comprising a first, a second, and a third medium,
    wherein each of the first, second, and third mediums have a different refractive index from the other mediums, and wherein a virtual representation of at least one camera lens is located in the first medium;
    generating a plurality of virtual planar patterns arranged in different positions or orientations relative to and in front of the virtual representation of the at least one camera lens, the plurality of virtual planar patterns being located in the third medium;
    identifying a plurality of points on each of the virtual planar patterns;
    generating a plurality of vector projections using the refractive index of each of the first, second, and third mediums and a set of physical calibration parameters associated with the camera system;
    wherein each generated vector projection corresponds to a best-fit refracted path between one of the at least one camera lens and a corresponding one of the identified plurality of points, and executing a calibration of the camera system using the generated plurality of vector projection. As will be appreciated, the method can be computer implemented.

Here, the plurality of mediums are linearly arranged and are contiguous with each other. The second medium is arranged between the first and third mediums.

The generated plurality of virtual planar patterns are arranged within the field of view of the at least one camera lens.

Each vector projection is a pathway between the at least one camera lens (or the focal point of the at least one camera lens), and a distinct point of the identified plurality of points. That is to say, each of the identified plurality of points is linked to the at least one camera lens by a corresponding generated vector projection.

The present application therefore provides a method of calibrating a camera system for underwater use, where said method can be carried out in advance of the camera system being on-site, and does not require the calibration to be carried out in water (i.e. the present calibration method is entirely "dry"). This method is therefore easier, faster, and more efficient than conventional methods of calibrating underwater camera systems, and provides for the compensation of distortion effects in water to a high degree of accuracy. Furthermore, because of the accuracy of the present method, it is not necessary to employ a domed viewport on the camera system, increasing flexibility of design. As an additional advantage, any standard off the shelf camera calibration algorithm and calibration pattern may be used when employing the present method.

It will be understood that references to "water" or "underwater" in the present context is intended to include both seawater and fresh water.

Generating each vector projection may comprise generating a plurality of candidate direction vectors within a 30 degree range of the virtual representation of the at least one camera lens, the centre of the range being the linear projection to the corresponding one of the identified plurality of points.

The set of physical calibration parameters may be acquired by carrying out a physical calibration of the camera system in air.

The camera system may be a stereo camera system, and the at least one camera lens may comprise two camera lenses, each of the two camera lenses corresponding to a camera of the stereo camera system.

The first medium may be air, the second medium may be a transparent material such as glass or plastic, and the third medium may be water.

The second medium may represent a viewport of the camera system, and the plurality of vector projections may be generated additionally using measured values for the thickness of the viewport of the camera system, and the distance from the viewport to the centre of each camera lens of the at least one camera lens of the camera system.

When the second medium represents a viewport of the camera system, the plurality of vector projections may be generated additionally using a further set of physical calibration parameters, the further set of physical calibration parameters being determined by carrying out a physical calibration of the camera system in-air with the viewport removed.

When the second medium represents a viewport of the camera system, the plurality of vector projections may be generated additionally using a scaling parameter for the viewport. The scaling parameter for the viewport may be determined by generating a further plurality of virtual planar patterns and associated plurality of vector projections in the three-dimensional virtual environment in which the third medium is air.

The method may further comprise using the camera system to collect a plurality of images underwater, perturbing at least one parameter of a plurality of parameters (the plurality of parameters comprising the refractive index of at least one of the plurality of regions, an alignment of the at least one camera lens with respect to the normal axis of the second medium, and the distance of the at least one camera lens from the second medium), and regenerating the plurality of vector projections using the perturbed parameters and the set of physical calibration parameters. A further calibration of the camera system may then be executed using the collected plurality of images and the regenerated plurality of vector projections.

In accordance with a second aspect of the invention, an electronic device may comprise one or more processors, a non-transitory memory, and one or more programs, wherein the one or more programs are stored in the non-transitory memory and configured to be executed by the one or more processors Here, the one or more programs include instructions for performing any of the methods of the first aspect of the invention discussed above.

In accordance with a third aspect of the invention, a non-transitory computer readable storage medium stores one or more programs. The one or more programs comprise instructions, which, when executed by an electronic device with one or more processors, cause the electronic device to perform any of the methods of the first aspect of the invention.

In the following, embodiments will be described with reference to the drawings in which.

DETAILED DESCRIPTION

Figure 1A:
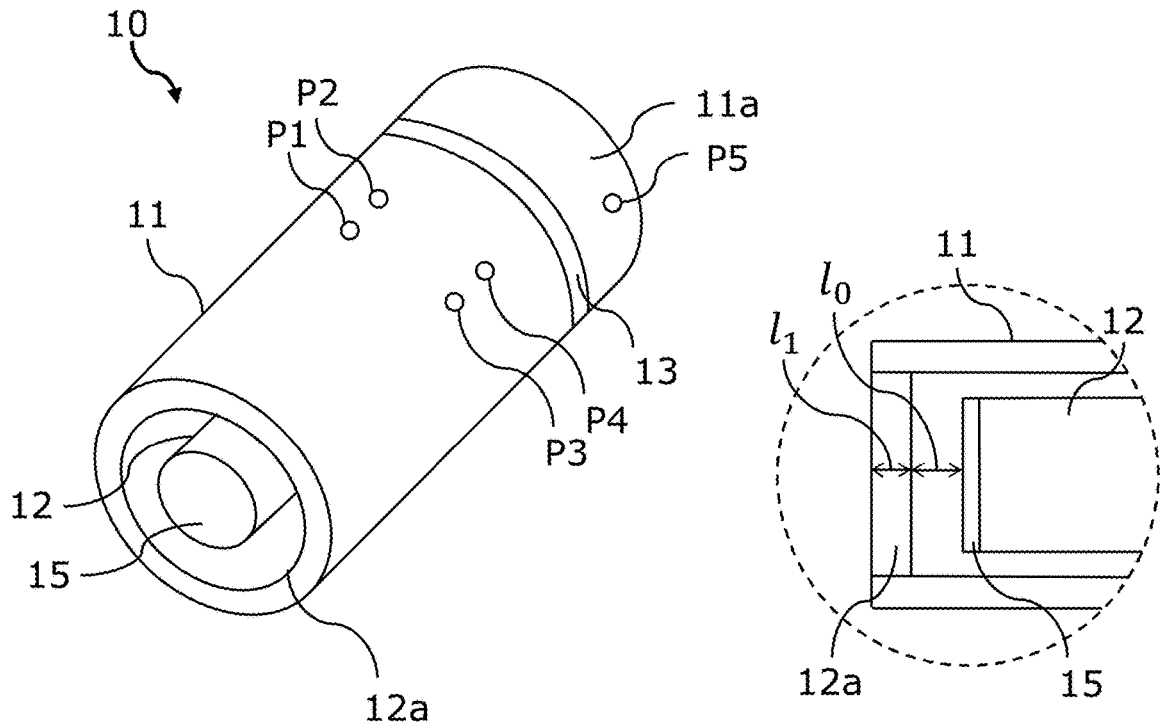
FIG. 1A shows a single camera system that may be calibrated using the method of the present application. The insert of FIG. 1A shows the cross-section of the camera system at the viewport end.

FIG. 1A shows a camera module 10 comprising a casing 11 that defines a watertight housing having an interior space. One end of the casing 11 includes a transparent window or viewport 12a. A camera 12 is mounted within the interior space and is arranged to capture images of the exterior environment through the viewport 12a. The camera 12 comprises a camera lens 15, which faces the viewport 12a. The interior space of the casing 11 can be accessed by removing a casing end cap 11a which is removably coupled to a body of the casing 11 via an o-ring sealed flange. An optional seal 13 is provided between the casing end cap 11a and the body of the casing to inhibit water ingress.

As shown in the inset of FIG. 1A showing the cross-section of the camera module 10 at the viewport 12a end (shown in the dashed circle), the camera lens 15 is separated from the inner surface of the viewport 12a by a distance $l_0$, and the viewport 12a has a thickness $l_1$.

Figure 1B:
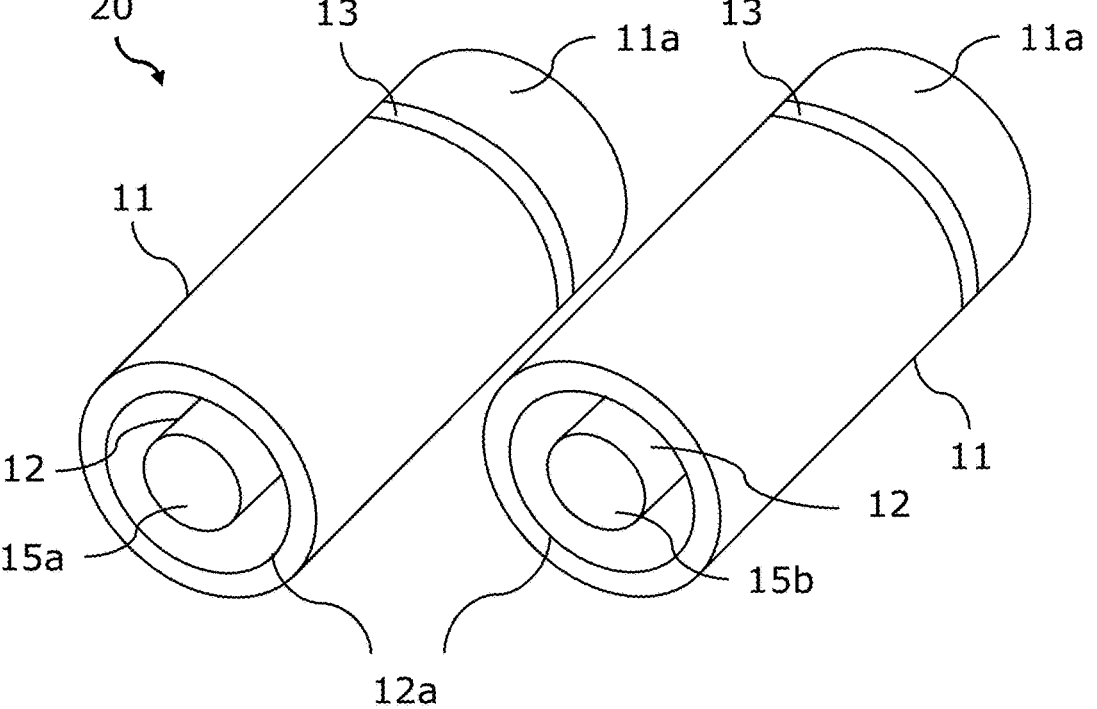
FIG. 1B shows a stereo camera system that may be calibrated using the method of the present application.

FIG. 1B shows an equivalent system for a stereo camera module 20 (or stereo camera system). Here, each camera 12 of the stereo camera module 20 comprises all of the same components as the single camera module 10 of FIG. 1A.

In a stereo camera system 20, each camera 12 of the stereo camera system 20 may be housed inside its own casing 11 (as shown in FIG. 1B), or both cameras 12 may be housed inside the same casing 11.

The casing 11 may have a plurality of ports P1-P5 on the outside that enable wired connections to be made between internal equipment located in the interior space and equipment located outside of the casing 11. In FIG. 1A there are five ports P1-P5 but in other embodiments there can be fewer or more ports and in some cases there are no ports. For clarity, the ports P1-P5 of the stereo camera system 20 shown in FIG. 1B are not shown.

It will be appreciated that the camera module 10 shown in FIG. 1A is not a limiting design, and that alternative suitable camera module designs may be employed. For instance, the viewport 12a may have a dome shape or may be flat.

In the case of a domed viewport 12a, the domed shape may neutralise some of the effects of refraction, although some calibration is often required as the camera may not be sufficiently located at the centre of curvature of the dome. In addition, calibration may be required to correct for errors due to manufacturing tolerances or defects.

Camera calibration refers to the process of deriving the parameters of a model that sufficiently describes the physical properties of a camera system such that the estimation of camera motion and scene three-dimensional structure can be performed reliably and accurately from the captured imagery.

When a camera system is used in a medium such as water, images captured by the camera system are affected by the refraction effects in the transmission of light through different mediums (for instance, from water, through the viewport glass, and into the environment inside the sealed underwater camera enclosure). Consequently, calibrations conventionally carried out in-air using a linear camera model no longer apply in view of the variation between the refractive effects in-air compared with those in-water.

As a result, in order to carry out adequate camera calibration, it is conventional to perform a calibration procedure in-water, and often on-site where images are to be collected (for instance, during an underwater survey). Such an in-water camera calibration usually involves placing a calibration chart with a known pattern within the field of view of the camera, and correcting for any perceived distortions in the captured image. This has to be repeated many times and from different angles in order to achieve camera calibration to a minimally acceptable level.

As a consequence, conventional in-water camera calibration procedures are time consuming and require significant effort to manoeuvre the underwater vehicle housing the camera system in an attempt to capture images of a calibration chart from the various different angles required to obtain the required spread of data points.

In addition, the quality of the camera calibration requires the cameras view (or views in the case of a stereo camera system) of the calibration chart to be varied in terms of orientation depth and position relative to the camera. In practice, this may be hard to achieve on-site and in-water due to unforeseen circumstances such as rough weather, limited space to manoeuvre the underwater vehicle, poor natural lighting, etc. This results in a reduction in the quality of the calibration and subsequently, the quality of the reconstruction that corrects for image distortions.

Furthermore, underwater calibration may not be possible at all when the camera system is lowered into the open sea from a boat or offshore platform. In these cases, the calibration process must take place at a different time, prior to being on-site, for instance in a dock. However, if the camera system is opened or knocked when being transported on-site, then the existing calibration is likely to become invalid and the procedure must be repeated in water. This can be difficult to achieve, if not impossible, when on-site, as discussed above.

By comparison, it is easier for a user to manipulate a calibration chart by hand in an in-air environment at a time of convenience prior to any on-site activity. Therefore, the ability to carry out the calibration procedure without the need to physically calibrate the camera system in-water would save time and avoid the disadvantages discussed above.

In the present application, a "dry" camera calibration is carried out virtually. The present method of calibrating a camera system relies on the calibration parameters that govern image formation inside the enclosure, such that the method may accurately model the end-to-end process of image formation for the camera system in underwater conditions. The calibration parameters may be calculated by carrying out a physical in-air calibration of the camera system. This then obviates the need for any part of the procedure to be carried out on-site and in-water, thereby saving time and substantial effort during on-site operations and making the calibration procedure more efficient.

Because of the accuracy of the present dry calibration method, it is not necessary to employ a domed viewport, thereby avoiding the requirements to carefully align the camera lens with the centre of curvature of the dome. Instead, flat viewports may be used, which are easier to manufacture, easier to clean, less bulky and cheaper. The use of domed viewports are susceptible to design imperfections and minor camera misalignment, and therefore the fact that the present method is not dependent on the design of the viewport, and can generalize for multiple types of materials, provides a further advantage.

In addition, any standard off the shelf camera calibration algorithm and calibration pattern may be used for in-air calibration when employing the present method.

Similarly, any off-the-shelf optimization package, calibration model and pattern can be used to derive the underwater parameters.

Figure 2:
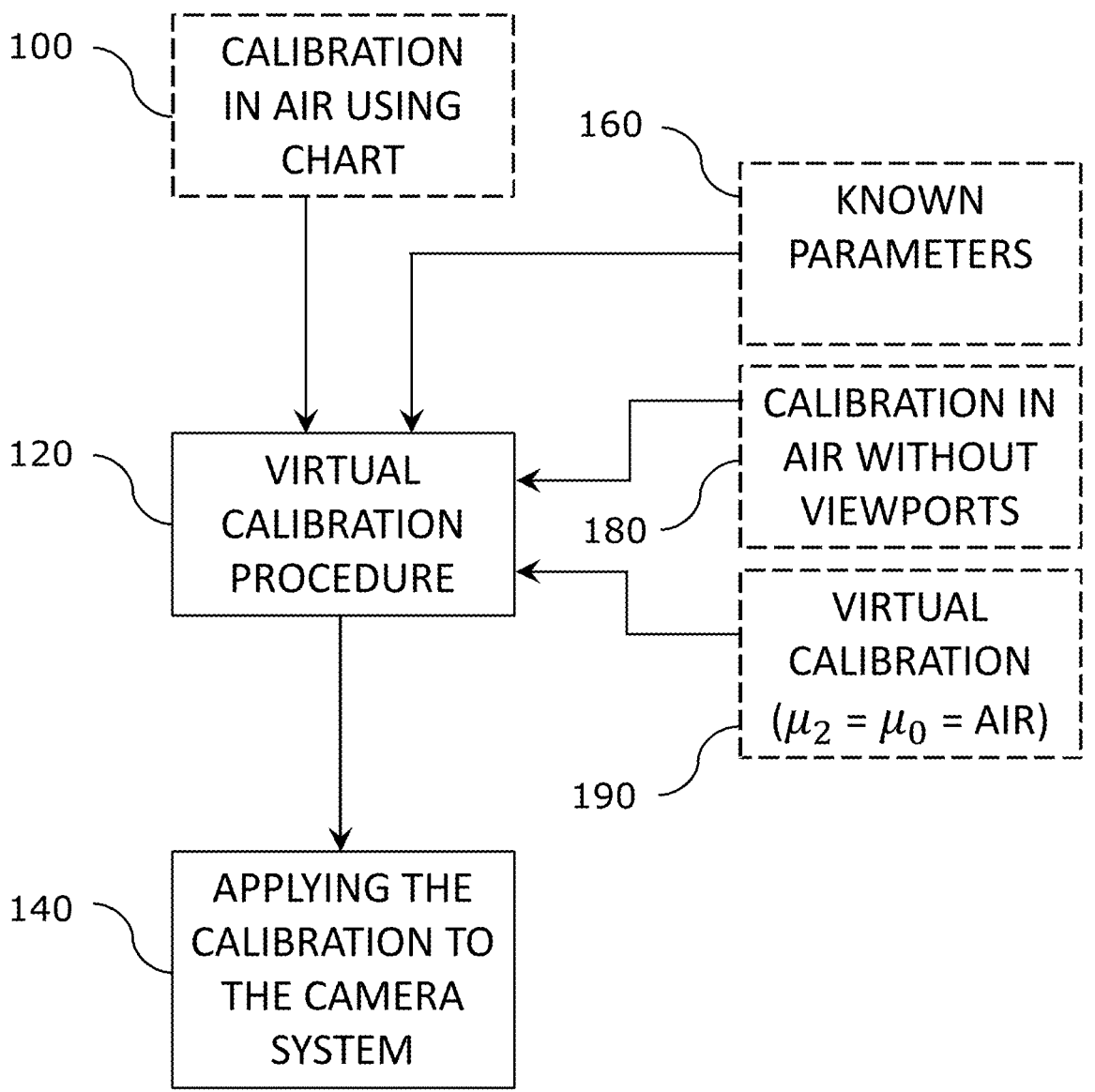
FIG. 2 shows a block diagram with the steps and procedures for calibrating a camera system using the method of the present application, including procedures that are optional.

FIG. 2 shows the different aspects of the calibration procedure. The optional steps and procedures that may be included in the calibration procedure are shown in FIG. 2 using dashed lines.

Broadly, this procedure for calibrating a camera system comprises mathematically defining a three-dimensional virtual space occupied by a plurality of mediums. Here, the plurality of mediums are defined as being linearly adjacent. That is to say, each medium is defined as being adjacent to another neighbouring medium, and the plurality of mediums are defined as being generally aligned in a single direction in the three-dimensional virtual space. Furthermore, each medium is defined as having a refractive index that is different from the immediately adjacent mediums. At least one virtual representation of a camera lens is defined as being located in one of the mediums of the virtual three-dimensional environment. The at least one virtual representation of a camera lens may be defined as being located in a medium that is at the end of the linearly adjacent plurality of mediums.

A plurality of virtual planar patterns are generated (or defined) as being located in the three-dimensional virtual space. Each of the plurality of virtual planar patterns is arranged in different positions or orientations relative to and in front of the virtual representation of the at least one camera lens. The plurality of virtual planar patterns may be defined as being exclusively located in a single medium of the plurality of mediums that is not the medium in which the virtual representation of the at least one camera lens is located.

A plurality of points on each of the plurality of virtual planar patterns is identified, and a plurality of the vector projections are generated (or determined, or calculated) using the refractive index of each of the plurality of mediums and a set of physical calibration parameters associated with the camera system. Here, each generated vector projection corresponds to a best-fit refracted path between one of the at least one camera lens and a corresponding one of the identified plurality of points.

The plurality of the vector projections for each of the plurality of virtual planar patterns are then used, along with the plurality of virtual planar patterns, to calibrate the camera system for use on-site (for example, underwater).

The calibration parameters may be derived by carrying out a calibration process on the camera system in-air (process 100 in FIG. 2). This may comprise carrying out a conventional in-air calibration method, for instance using a calibration chart and placing the chart within the field of view of the camera system and correcting any distortions in the image captured by the camera system. The calibration chart comprises a pattern in which specific points may be identified for the calibration process. Here, a calibration chart employing a simple "chessboard" pattern is discussed, but many various patterns may be used on a calibration chart (for example, a "ChArUco" pattern).

The in-air calibration of the camera system allows for the parameters of the actual model of the process of image formation inside the enclosure to be estimated. The in-air calibration of the camera system therefore relates to the basic geometry of the camera system itself, without water-based refraction effects. Here, the physical calibration parameters may be referred to as camera intrinsic parameters (such as, but not limited to, focal length, aspect ratio, image location of the optical axis for each pixel, and radial distortion coefficients) and potentially extrinsic parameters in the case of a stereo camera system (such as, but not limited to, the baseline length, i.e. the separation between the two cameras, and orientation matrices of the left-right camera planes). The underwater calibration delivered by the present method comprises the same set of parameters, however with values tuned to account for the distortion effects incurred by refractions.

Where the camera system is a stereo camera system, the in-air calibration is carried out to provide the relevant parameters for both cameras of the stereo camera system, additionally accounting for the relative position and orientation between the two cameras.

Alternatively, if the camera intrinsic parameters and distortion coefficients for a given camera system are already known, then it is not necessary to carry out a physical in-air calibration step. The known camera intrinsic parameters and distortion coefficients can then be applied to the virtual calibration, as discussed further below.

Optionally, an additional (or alternative) in-air calibration of the camera system can be carried out with the viewport(s) 12a removed (process 180 in FIG. 2), so that there are no refractive effects from the viewport material. This in-air calibration without the viewport(s) 12a can then be included in the virtual calibration process to reduce the search space used during virtual calibration.

The virtual calibration procedure (process 120 in FIG. 2) comprises defining a virtual three-dimensional environment 200 using a computer system. Here, the virtual three-dimensional environment 200 includes a virtual representation of the camera lens 15 (or each camera lens 15a and 15b, in the case of a stereo camera system 20).

The virtual three-dimensional environment 200 includes multiple separate regions, each of which is defined as being occupied by a different medium. Specifically, the region directly in front of the virtual representation of the camera lens 15 (i.e. in the field of view of the camera lens 15) is defined as being occupied by a first medium N1 (shown in FIG. 5). In the case of a stereo camera system 20, the first medium N1 occupies the space directly in front of the virtual representation of each camera lens 15a and 15b (i.e. in the field of view of each camera lens 15a and 15b). A second medium N2 (shown in FIG. 5) is defined as being located in a region adjacent to the region occupied by the first medium N1, and within the field of view of the camera lens 15 (or within the field of view of each camera lens 15a and 15b, in the case of a stereo camera system 20). A further third medium N3 (shown in FIG. 5) is defined as being located in a region adjacent to the region occupied by the second medium N2, and within the field of view of the camera lens 15 (or within the field of view of each camera lens 15a and 15b, in the case of a stereo camera system 20).

Each of the mediums N1, N2, and N3 defined in the virtual three-dimensional environment 200 is defined as having a refractive index that is different from that of the mediums occupying directly adjacent regions. In the case of a camera system for underwater operation, the first medium N1 may correspond to the air inside the casing 11 separating the camera lens 15 (or each camera lens 15a and 15b, in the case of a stereo camera system 20) from the viewport 12a. Likewise, the second medium N2 may correspond to the material of the viewport 12a, and the third medium N3 may correspond to water such as sea water. Therefore, the refractive index values $\mu_0$, $\mu_1$, and $\mu_2$ for the respective first, second, and third mediums N1, N2, and N3 may each be defined to be the refractive index of that medium in a corresponding physical environment (i.e. based on known or experimentally derived refractive index values).

For instance, the first medium N1 may be defined as having the refractive index $\mu_0$ of air, the second medium N2 may be defined as having the refractive index $\mu_1$ of the chosen material for the viewport 12a (i.e. glass or similar), and the third medium N3 may be defined as having the refractive index $\mu_2$ of water such as sea water. Here, the refractive index $\mu_2$ chosen may be an approximate value based on known experimental values for the medium in question.

In this embodiment, the virtual three-dimensional environment 200 comprises three different mediums N1, N2, and N3, but it will be understood that more, or fewer, regions with different mediums may be employed.

It will be understood that the present method does not require the virtual three-dimensional environment 200 to be simulated in its entirety. Instead, only an appropriate coordinate space may be defined, and the virtual representation of the camera lens 15 and the three different mediums N1, N2, and N3 within that coordinate space may likewise be defined mathematically. As a result, the hardware resources necessary for carrying out the virtual calibration procedure (process 120 in FIG. 2) can be minimised.

Within the region of the virtual three-dimensional environment 200 defined as being occupied by the third medium N3, a plurality of virtual planar patterns 210 are then defined randomly.

Figure 3:
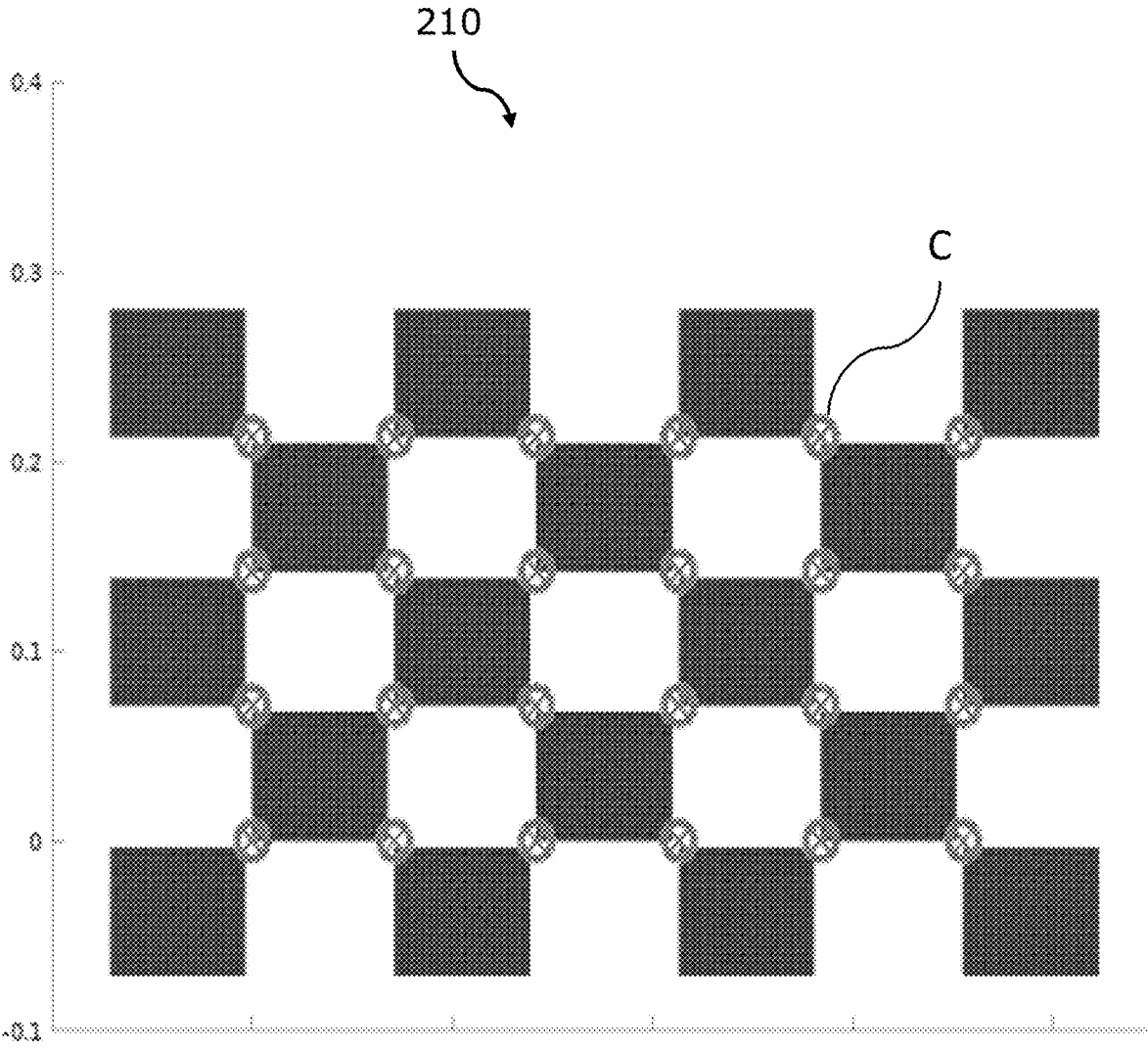
FIG. 3 shows an example of a virtual planar pattern that may be employed in the method of the present application.

An example of a virtual planar pattern 210 is shown in FIG. 3. Here, the virtual planar pattern 210 takes the form of a "chessboard", but various other appropriate designs may be chosen instead. The virtual planar pattern 210 is a virtual equivalent of a calibration chart used in conventional physical in-air or in-water calibration methods.

In each virtual planar pattern 210, the coordinates of the corners (indicated with circles C at the intersections between squares in FIG. 3) are known with respect to a local coordinate frame, since the square size on each virtual planar pattern 210 is also known. These corners can be easily and accurately identified in an image. The known Euclidean coordinates of the corners in the local coordinate frame of each virtual planar pattern 210, and their corresponding points when imaged by a virtual camera, can be used to estimate the parameters of a virtual camera model that produced the virtual image.

Figure 4:
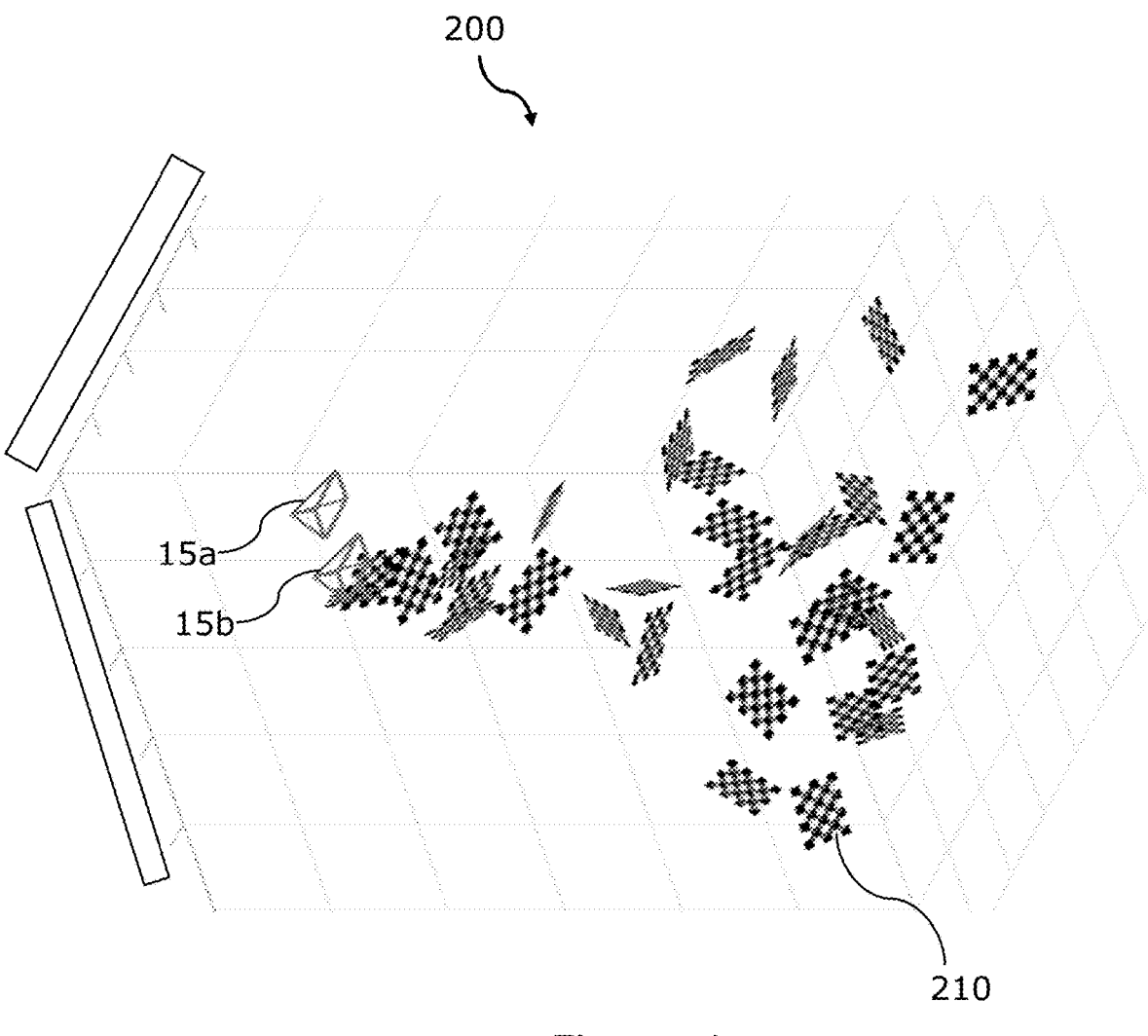
FIG. 4 shows a representation of a random arrangement of planar patterns generated in front of the virtual representations of the camera lenses of a stereo camera system in a virtual three-dimensional environment.

To obtain a suitably accurate estimate of the parameters, multiple images of the virtual planar pattern 210 in various orientations and positions are required. For instance, 30 to 40 or more separate virtual planar patterns 210 may be randomly generated in different orientations and positions relative to the virtual camera 15 (or cameras 15a and 15b, in the case of a stereo camera system 20) and within the field of view of the camera 15 (or cameras 15a and 15b, in the case of a stereo camera system 20). An example of such a random distribution of virtual planar patterns 210 arranged relative to the virtual cameras 15a and 15b of a stereo camera system 20 is shown in FIG. 4.

The generated virtual planar patterns 210 may also be positioned at variously defined depths. For instance, virtual planar patterns 210 may be generated at defined depths of between 0.5 to 6 metres.

Each corner C at the intersections between the squares on each virtual planar pattern 210 of the plurality of virtual planar patterns 210 is then identified as a three-dimensional point M in the virtual three-dimensional environment 200, forming a set of three-dimensional M points in the virtual three-dimensional environment 200. For each three-dimensional point M, a vector projection v is then generated between the virtual camera lens 15 and the three-dimensional point M. Each vector projection v passes through the intervening first, second, and third mediums N1, N2, and N3 between the three-dimensional point M and the camera lens 15 (or each camera lens 15a and 15b, in the case of a stereo camera system 20).

Each vector projection v is a bearing vector which identifies the direction of the light ray when it hits the camera focal point (also referred to as projection center).

To calculate the vector projection v for each three-dimensional point $M \in \mathbb{R}^3$, it is necessary to estimate a best-fit linear calibration that corresponds to the actual physical refractive projections taking place underwater when the camera system is in use. To achieve this, a function $f(M; \theta)$ and an image projection function $p(m; w)$ are employed. The function $f(M; \theta)$ accounts for refractions underwater, and projects between the three-dimensional point M onto a normalized Euclidean projection $m = [x \ y \ 1]^T$ on the camera plane at a depth of Z=1. The image projection function $p(m; w)$ includes w as the vector of camera intrinsic parameters and distortion coefficients (which is either known or acquired by carrying out the physical calibration in-air of the camera system, as discussed above).

The following discussion is with reference to a stereo camera system 20, but an equivalent approach can be taken with regard to a single camera system. Here, the problem of generating the vector projection $v$ is then solved by optimising the following function:

$$J\left(\psi, b, M^{(s)}, w_L, w_R; \theta, e_L^{(s)}, e_R^{(s)}\right) =$$
$$\int_{\mathcal{S}} \left\| p\left(f\left(M^{(s)}; \theta\right); w_L\right) - e_L^{(s)} \right\|^2 + \left\| p\left(f\left(R(\psi)^T\left(M^{(s)} - b\right); \theta\right); w_R\right) - e_R^{(s)} \right\|^2 ds$$

Here, $W_L$ and $W_R$ are the left and right camera intrinsic-distortion parameter vectors, $\psi \in \mathbb{R}^3$ is the relative rotation parameter vector, b is the baseline vector and M(s) is the three-dimensional point in question. The vectors $$e_L^{(s)}, e_R^{(s)}$$

$\in \mathbb{R}^2$ are associated with vectors corresponding to the projections in the left and right image of the stereo camera system, the index variable $s \in \mathcal{S}$ is used to impose this correspondence constraint. The refraction parameters $\theta$ are considered a priori known (in this stage of dry-calibration) and therefore kept fixed in the cost function.

As stated above, the above function can be simplified to apply in the case where the calibration is for a single camera system.

The recovery of the stereo camera system calibration, and the generation of the vector projection $v$ for each point M, can be cast as the following optimization:

$$\text{minimise } J\left(\psi, b, M^{(s)}, w_L, w_R; \theta, e_L^{(s)}, e_R^{(s)}\right)$$

Minimising such a function for a camera system operating in-air is straightforward, since this amounts to a simple Euclidean projection of the three-dimensional point M along a straight line to the camera lens 15 (or each camera lens 15a and 15b, in the case of a stereo camera system 20).

However, for a camera system operating underwater, the function $f(M; \theta)$ becomes complicated due to refractions and cannot be expressed analytically. This is because in order to find the projection of a three-dimensional point M on a plane following the refracted trajectory of light successively through multiple mediums, each with a different refractive index, it is necessary to either solve a 7-th degree polynomial or resort to a brute force method in order to recover the correct direction vector $v \in \mathbb{R}^3$ travelling to and from the camera. The correct direction vector $v \in \mathbb{R}^3$ is the vector that would produce the correct refracted light trajectory that crosses paths with the three-dimensional point M in the virtual three-dimensional environment 200.

The function $f(M; \theta)$ itself the solution of another function, which can be constructed using Snell's law as follows:

$$f(M; \theta) =$$
$$\underset{v \in \mathcal{S}^2, \lambda \in \mathbb{R}_+}{\text{argmin}} \left\| U\left(\frac{l_0}{n^T v}\begin{bmatrix} \cos(\phi_0) \\ \sin(\phi_0) \end{bmatrix} + \frac{l_1}{\cos(\phi_1)}\begin{bmatrix} \cos(\phi_1) \\ \sin(\phi_1) \end{bmatrix} + \lambda\begin{bmatrix} \cos(\phi_2) \\ \sin(\phi_2) \end{bmatrix}\right) - M \right\|^2$$

Here, $\mathbb{S}^2$ denotes the three-dimensional unit sphere centred at the origin, and $l_0$ is the distance from the centre of the camera lens 15 to the viewport, $l_1$ is the thickness of the viewport 12a. Both $l_0$ and $l_1$ are measured along the normal vector n of the viewport 12a (i.e. the vector orthogonal to the given surface of the viewport 12a). Similarly known are the refractive indexes $l_0$ (e.g. air), $\mu_1$ (i.e. the chosen viewport material), and $\mu_2$ (i.e. water or seawater). The length $\lambda$ corresponds to the vector length to the chosen three-dimensional point M in the third medium N3 of the virtual three-dimensional environment 200. The angles $\theta_0$, $\theta_1$, and $\theta_2$ are implicit functions of the direction vector $v$ via Snell's law as follows:

$$\cos(\phi_0) = n^T v$$
$$\sin(\phi_0) = \sqrt{1 - \left(n^T v\right)^2}$$
$$\cos(\phi_1) = \sqrt{1 - \left(\frac{\mu_0}{\mu_1}\right)^2\left(1 - \left(n^T v\right)^2\right)}$$
$$\sin(\phi_1) = \frac{\mu_0}{\mu_1}\sqrt{1 - \left(n^T v\right)^2}$$
$$\cos(\phi_2) = \sqrt{1 - \left(\frac{\mu_1}{\mu_2}\right)^2\left(1 - \cos^2(\phi_1)\right)}$$
$$\sin(\phi_2) = \frac{\mu_1}{\mu_2}\sqrt{1 - \cos^2(\phi_1)}$$

Any of the distance from the centre of the camera lens 15 to the viewport $l_0$, the thickness $l_1$ of the viewport 12a, and the refractive index of the environment where the camera will be used $\mu_2$ may be known parameters for the specific camera system in question (process 160 in FIG. 2). If any of these parameters are not known, then the virtual calibration can be carried out using estimated ranges, and can be refined at a later stage in a refinement step (discussed further below).

Figure 5:
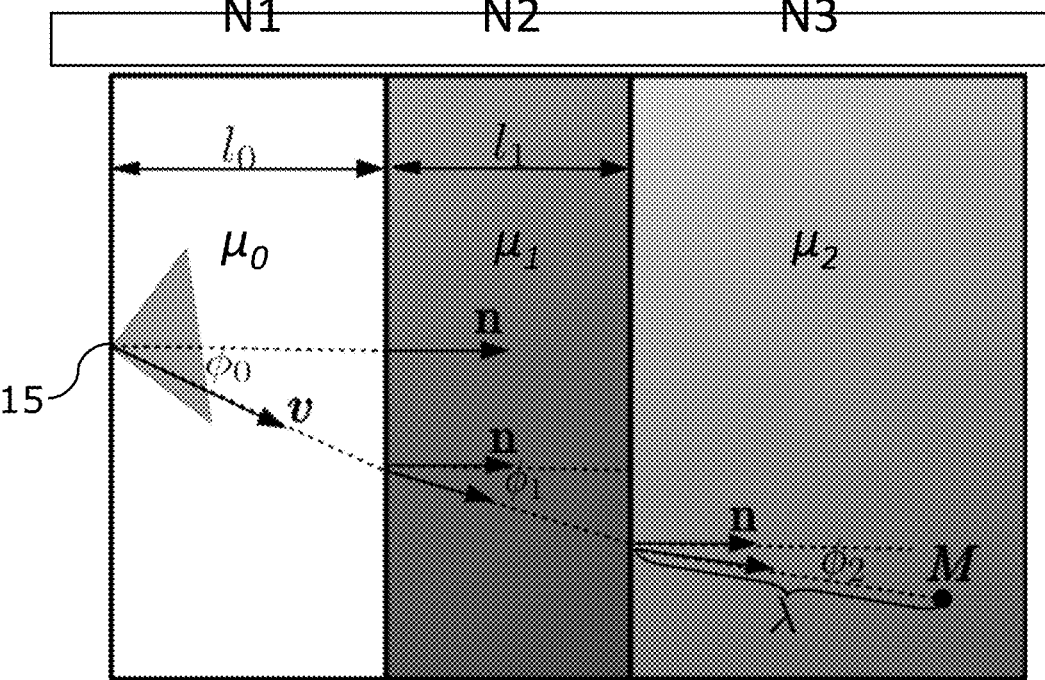
FIG. 5 shows a representation of the vector projection from the camera lens to a chosen point on a planar pattern in the virtual three-dimensional environment, passing through multiple mediums with different refractive indices.

FIG. 5 shows an example of a direction vector u projected from a camera lens 15 to a three-dimensional point M through the first, second, and third mediums N1, N2, and N3. Here, the refractive indexes of each medium $\mu_0$, $\mu_1$, and $\mu_2$ causes the direction vector $v$ to follow an overall non-linear path to the three-dimensional point M, where the direction vector $v$ in each medium travels at an angle compared to the normal vector n (i.e. angles $\theta_0$, $\theta_1$, and $\theta_2$ for the respective first, second, and third mediums N1, N2, and N3).

This allows for the constructions of a matrix, U, with a coplanarity that is a consequence of Snell's law, and that contains the overall trajectory of a refracted ray:

$$U = \left[n \quad \frac{v - \left(n^T v\right)n}{\left\| v - \left(n^T v\right)n \right\|}\right]$$

Here, the matrix U contains an orthonormal basis (i.e., two orthogonal unit-norm 3D vectors) for a plane of refractions associated with a specific direction vector v.

Based on the functional expression for $f(M; \theta)$ given above, it is possible to calculate the optimal refraction trajectory associated with the direction vector $v \in \mathbb{R}^3$ that represents the Euclidean projection of a three-dimensional point M through the first, second, and third mediums N1, N2, and N3 (i.e. water, glass, and air) to the camera lens 15.

Instead of solving a 7-th degree polynomial system, a ray-casting method is employed that searches a range of direction vectors u (where the range of angles is limited by the refractive indexes of the different mediums to avoid unnecessary searches) in an attempt to minimise the functional of $f(M; \theta)$.

In particular, for each candidate direction vector, the refraction trajectory is computed by minimising the functional of $f(M; \theta)$ in terms of the reconstruction error, i.e. the deviation of the reconstructed point from the three-dimensional point M. The range of candidate direction vectors may be set to be no wider than 30 degrees from the linear projection to the three-dimensional point M. That is to say, the actual linear projection of the three-dimensional point M (i.e. as if it was formed in air conditions) is employed as a starting point and a 30-degree cone is defined around that linear projection to define the range of candidate direction vectors. This then allows for the quantization of directions to have a very high resolution. Thus, the projection of the three-dimensional point M is the direction vector v that produces the minimum reconstruction error across the quantized range. As a result, this numerical method can achieve sub-millimetre accuracy when verifying the back-projection of the recovered direction vector v. This approach then provides a model that more accurately reflects the true physics governing image formation underwater.

When employing a computer model of a physical in-air calibration procedure, it is possible to employ a model that is an exact match to the physics that govern image formation. However, when employing a computer model of a physical in-water calibration (as in the present case), the model merely approximates the true physics that govern image formation underwater. Nonetheless, this approximation has greater accuracy where the distance of the focal point of the camera to the inner surface of the viewport is small (i.e. 8 mm+/−2 mm).

Therefore, provided accurate knowledge of the in-air calibration parameters, the refractive properties of the mediums in question (i.e. air, glass, and water/seawater), as well as viewport thickness $l_1$ and orientation of the camera 12 with respect to the viewport normal are known, the present method is able to map any three-dimensional point M to an image location at subpixel accuracy.

As discussed above, the physical in-air calibration parameters for any given camera system may be measured by carrying out a separate in-air calibration step (process 100 in FIG. 2). If the physical calibration parameters are already known, then no separate in-air calibration step is needed. The physical in-air calibration parameters, which may include but not be limited to the viewport thickness $l_1$, the orientation of the camera 12 with respect to the viewport normal, and the focal length (used to estimate the in-water focal length). By using the physical in-air calibration parameters, the search space used during virtual calibration may be reduced further.

Therefore, the plurality of virtual planar patterns 210 randomly generated in the virtual three-dimensional environment 200 form the basis for a Monte Carlo-style solution. Here, the set of three-dimensional points M identified on each of the virtual planar patterns 210 (in terms of position and orientation), can be used to accurately project each three-dimensional point M onto the camera lens 15 (or each camera lens 15a and 15b, in the case of a stereo camera system 20) in the virtual three-dimensional environment 200. By grouping the three-dimensional points M (and their associated generated direction vectors V) based on which virtual planar pattern 210 they correspond to, the image distortion encountered when using the camera system underwater can be accurately determined in the virtual three-dimensional environment 200.

It is then possible to carry out a virtual calibration of the camera system (or stereo camera system 20) (process 140 in FIG. 2), by fitting a linear calibration model (for example, by using an iterative method such as the Levenberg-Marquardt algorithm) to the generated chessboard points M and respective direction vectors v.

Optionally, an additional virtual calibration procedure (process 190 in FIG. 2) may be performed prior to carrying out the virtual calibration procedure discussed above (process 120 in FIG. 2). Here, where the refractive index $\mu_0$ of the first medium N1 may again be defined as that of air, and the refractive index $\mu_1$ of the second medium N2 may again be defined as that of the chosen viewport material. However, the refractive index $\mu_2$ of the third medium N3 may instead be defined as being that of air. In scenarios in which the refractive index $\mu_0$ of the first medium N1 is not defined as that of air, the refractive index $\mu_2$ of the third medium N3 may instead be defined as being the same as whatever appropriate material occupies the first medium N1 (e.g. vacuum). This results in a calculated plurality of vector projections u that are subject to a scaling effect that corresponds only to the refractive index $\mu_1$ of the second medium N2 (i.e. the viewport(s) 12a). This scaling effect can be defined as a scaling parameter, which can then be included in the subsequent virtual calibration procedure (process 120 in FIG. 2) to remove the scaling effect of the viewport(s) 12a. This provides the same advantages as performing the in-air calibration of the camera system with the viewport(s) 12a removed discussed above (process 180 in FIG. 2), so that there are no refractive effects from the viewport material.

Using the above method of virtual calibration, a camera system (either a single camera system or a stereo camera system 20) can be calibrated for underwater use to a high level of accuracy without requiring an in-water calibration step, and in advance of the camera system being used on-site in water. The resulting calibration can outperform calibrations obtained via conventional physical in-water calibration methods. This is because the virtual calculation of the direction vectors u can cover the space surrounding the camera system to a high degree of granularity, whereas a conventional physical in-water calibration method is subject to imperfections arising from the in-water environment (i.e. rough weather, non-optimal calibration chart positioning, imperfect calibration chart imaging, poor visibility, etc.).

When calibrating a stereo camera system 20, the process includes the monocular calibration of each camera plus accounting for the relative position and orientation between the two cameras. As such, this procedure is more detailed than carrying out two separate monocular calibrations (i.e. one for each camera). In addition to two separate monocular calibrations, it is necessary to calibrate relative orientation and baseline of the stereo camera systems 20 and, optionally, the re-calibration of intrinsic and distortion parameters of each camera. In practice, this requires either a physical calibration with the aid of a suitable pattern (in which case, the advantage of avoiding physical calibration is negated), or following the virtual point generation method as discussed above.

Figure 6:
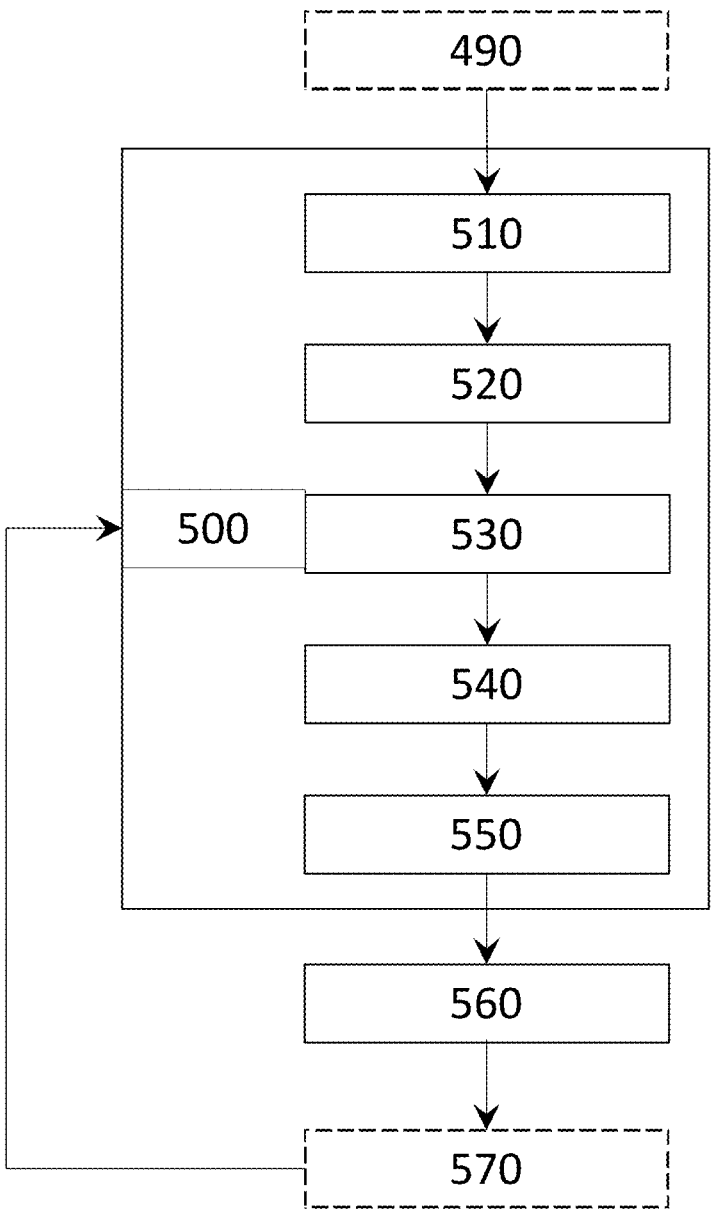
FIG. 6 shows a flowchart of the steps taken in the calibration procedure of the present application.

FIG. 6 shows a flowchart that summarises the steps taken when carrying out the calibration method of the present application.

At step 490, the camera system may be optionally calibrated in-air (this step being shown in a dashed line in FIG. 6 to show that it is optional). This allows the physical geometric calibration parameters of the camera system in question to be derived for use in the subsequent virtual calibration procedure. If the physical calibration parameters of the camera system in question are already known, then this step is unnecessary.

Next, the virtual calibration procedure 500 is performed. This may be done using a computer system or similar computational resource, or electronic device comprising one or more processors and a non-transitory memory storing a one or more programs configured to execute the virtual calibration procedure 500. Likewise, a non-transitory computer readable storage medium may store one or more programs that comprise instructions that, when executed, carry out the virtual calibration procedure 500.

At step 510 of the procedure 500, a virtual representation of the camera lens 15 (or camera lenses 15a and 15b in the case of a stereo camera system 20) is defined in a virtual three-dimensional environment 200. The virtual representation of the camera lens 15 is defined as being located in a region defined as being occupied by a first medium N1 with a refractive index $\mu_0$. A second medium N2 is defined as occupying a region adjacent to the region occupied by the first medium N1, and is within the field of view of the virtual representation of the camera lens 15. The second medium N2 has a different refractive index $\mu_1$ to the refractive index $\mu_0$ of the first medium N1. A third medium N3 is defined as occupying a region adjacent to the region occupied by the second medium N2, and is within the field of view of the virtual representation of the camera lens 15. The third medium N3 has a different refractive index $\mu_2$ to the refractive index $\mu_1$ of the second medium N2.

At step 520 of the procedure 500, a plurality of virtual planar patterns 210 are defined in the virtual three-dimensional environment 200 and located in the third medium N3, each with a random position and orientation and lying within the field of view of the camera lens 15 (or camera lenses 15a and 15b in the case of a stereo camera system 20).

At step 530 of the procedure 500, a plurality of points are identified on each of the virtual planar patterns 210, generating a set of three-dimensional points M located in the virtual three-dimensional environment 200.

At step 540 of the procedure 500, a plurality of vector projections v are generated, each vector projection v following a path through the first, second, and third mediums N1, N2, and N3 between the camera lens 15 (or one of the camera lenses 15a and 15b in the case of a stereo camera system 20) and a three-dimensional point M in the virtual three-dimensional environment 200. Each vector projection v represents a best-fit refraction trajectory. The physical calibration parameters of the camera system in question are used in the generation of the vector projections v.

At step 550 of the procedure 500, the plurality of vector projections v are separated into groups, each vector projection v being grouped with other vector projections v associated with three-dimensional points M from the same virtual planar pattern 210. The image projections of each such virtual planar pattern 210 on the camera system (or stereo camera system 20) are then calculated.

At step 560, the image projections of the virtual planar patterns 210 are then used to calibrate the camera system (or stereo camera system 20) in question. This final step may be achieved using any appropriate off-the-shelf software package (for example, OpenCV).

In addition to the above, the calibration of the camera system may be subsequently further refined in optional step 570 (this step being shown in a dashed line in FIG. 6 to show that it is optional). The accuracy of the calibration method depends on the accuracy of the following factors:

The in-air calibration to measure the physical calibration parameters of the camera system in question.

The normal vector n of the viewport material in the local camera coordinate frame.

The distance of the camera lens 15 (or camera lenses 15a and 15b) from the viewport 12a along the normal of the viewport 12a.

The specific refractive index of water in which the camera system will operate.

The accuracy of the in-air calibration is considered to be sufficiently accurate and cannot be improved upon. However, the latter three factors can have a minor effect on the calibration estimate, and consequently the dry calibration estimate can be further improved if the estimates of these factors can be improved.

The normal vector n of the viewport 12a is typically the vector $[0\ 0\ 1]^T$. That is to say, the normal vector n is fully aligned with the optical axis (the camera module 10 can be designed as such). However, minor misalignments of up to 3 to 4 degrees can occur. Similarly, the distance from the inner surface of the viewport 12a to the focal point of the camera lens 15 (or lenses 15a and 15b) is simply the focal length plus the distance from camera lens to viewport surface. This distance is again usually constrained to up to 1 to 2 millimetres by the design of the camera module 10, but it cannot be accurately determined in advance (i.e. the actual distance is unique to the specific camera module 10). Likewise, the refractive index of water is known to be affected by salinity, temperature, depth, and so on, and again cannot be determined in advance of the camera module 10 being used on site and in-water.

Refinement step 570 may be carried out on-site while the camera module 10 collects underwater images of arbitrary structures. This sampling of arbitrary underwater images is used to extract easily identifiable features that can be used in the refinement step. In the case of a stereo camera system 20, these identified features are matched very accurately from the left to right images by means of absolute patch distances (i.e. the absolute photometric (i.e., brightness) distance between image patches). A significant number of features should be identified in the images in order to adequately overcome any potential errors (for instance, between fifty and two hundred). When enough image samples have been collected, reconstruction errors are minimized over small perturbations of the three factors discussed above using the exact refraction physics captured by the function $f(M; \theta)$. Specifically, the parameters of the refractive indexes for water and the viewport medium, $\mu_1$ and $\mu_2$, the normal vector n, and the distance $l_0$ from the centre of the camera lens to the viewport 12a are varied in small intervals. These parameters are known to be constrained to small ranges, and so these ranges may be sufficiently covered by a few thousand perturbed-value combinations.

This is achieved by repeating steps 510 to 550 (i.e. the generation of the virtual planar patterns 210) for each perturbation of the parameters in question to find the parameters that provide the smallest reconstruction error. Here, the same in-air calibration parameters that were used in the initial virtual calibration may be used again in the refinement virtual calibration.

Once the combination of parameter values that produce the smallest average reconstruction error are found, the calibration of the camera system is updated for the specific on-site environment using the refined aforementioned parameters in a new virtual calibration.

The above discussed method of calibrating a camera system concerns a camera system for use underwater. However, it will be understood that the present method may be applied to a camera system operating in any mediums in which the refractive properties of that mediums result in image distortions. For instance, the present method may be applied to a camera system operating in an environment comprising dense gases or industrial fluids (for instance, ethanol or isopropyl alcohol).

Whilst certain embodiments have been described, these embodiments have been presented by way of example only, and are not intended to limit the scope of the application. Indeed, the novel devices, and methods described herein may be embodied in a variety of other forms; furthermore, various omissions, substitutions and changes in the form of the devices, methods and products described herein may be made without departing from the scope of the present application. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage. The accompanying claims and their equivalents are intended to cover such forms or modifications as would fall within the scope of the application.

The invention claimed is:

1. A method of calibrating a camera system, the method comprising:
defining a three-dimensional virtual environment comprising a plurality of linearly adjacent mediums, the linearly adjacent mediums comprising a first, a second, and a third medium,
wherein each of the first, second, and third mediums have a different refractive index from the other mediums, and wherein a virtual representation of at least one camera lens is located in the first medium;
generating a plurality of virtual planar patterns arranged in different positions or orientations relative to and in front of the virtual representation of the at least one camera lens, the plurality of virtual planar patterns being located in the third medium;
identifying a plurality of points on each of the virtual planar patterns;
generating a plurality of vector projections using the refractive index of each of the first, second, and third mediums and a set of physical calibration parameters associated with the camera system;
wherein each generated vector projection corresponds to a best-fit refracted path between one of the at least one camera lens and a corresponding one of the identified plurality of points, and
executing a calibration of the camera system using the generated plurality of vector projections.

2. The method of calibrating a camera system according to claim 1, wherein generating each vector projection comprises generating a plurality of candidate direction vectors within a 30 degree range of the virtual representation of the at least one camera lens, the centre of the range being the linear projection to the corresponding one of the identified plurality of points.

3. The method of calibrating a camera system according to claim 1, wherein the set of physical calibration parameters are acquired by carrying out a physical calibration of the camera system in air.

4. The method of calibrating a camera system according to claim 1, wherein the camera system is a stereo camera system, and wherein the at least one camera lens comprises two camera lenses, each of the two camera lenses corresponding to a camera of the stereo camera system.

5. The method of calibrating a camera system according to claim 1, wherein the first medium is air, the second medium is a transparent material, and the third medium is water.

6. The method of calibrating a camera system according to claim 1,
wherein the second medium represents a viewport of the camera system, and
wherein the plurality of vector projections are generated additionally using measured values for the thickness of the viewport of the camera system, and the distance from the viewport to the center of each camera lens of the at least one camera lens of the camera system.

7. The method of calibrating a camera system according to claim 1,
wherein the second medium represents a viewport of the camera system, and
wherein the plurality of vector projections are generated additionally using a further set of physical calibration parameters, the further set of physical calibration parameters being determined by carrying out a physical calibration of the camera system in-air with the viewport removed.

8. The method of calibrating a camera system according to claim 1,
wherein the second medium represents a viewport of the camera system, and
wherein the plurality of vector projections are generated additionally using a scaling parameter for the viewport, and
wherein the scaling parameter for the viewport is determined by generating a further plurality of virtual planar patterns and associated plurality of vector projections in the three-dimensional virtual environment in which the refractive index of the first medium and the third medium are each that of air.

9. The method of calibrating a camera system according to claim 1, wherein the method further comprises:
using the camera system to collect a plurality of images underwater;
perturbing at least one parameter of a plurality of parameters, the plurality of parameters comprising:
the refractive index of at least one of the plurality of regions;
an alignment of the at least one camera lens with respect to the normal axis of the second medium;
the distance of the at least one camera lens from the second medium;
regenerating the plurality of vector projections using the perturbed parameters and the set of physical calibration parameters; and
executing a further calibration of the camera system using the collected plurality of images and the regenerated plurality of vector projections.

10. An electronic device comprising:
one or more processors;
a non-transitory memory; and
one or more programs, wherein the one or more programs are stored in the non-transitory memory and configured to be executed by the one or more processors, the one or more programs including instructions for performing the method of claim 1.

11. A non-transitory computer readable storage medium storing one or more programs, the one or more programs comprising instructions, which, when executed by an electronic device with one or more processors, cause the electronic device to perform the method of claim 1.

* * * * *